3,242,054
PROCESS FOR THE PRODUCTION OF
β-CAROTENE
Leon Ninet and Jacques Albert Renaut, Paris, and Robert Charles Francois Tissier, Maisons-Alfort, France, assignors to Rhone-Poulenc S.A., Paris, France, a corporation of France
No Drawing. Filed Mar. 4, 1963, Ser. No. 262,369
5 Claims. (Cl. 195—28)

The present invention relates to an improved process for the production of β-carotene by fermentation.

It is known to obtain β-carotene by submerged fermentation of microorganisms of the genus Choanephora or Blakeslea. Various publications have described the conditions which favour the production of β-carotene. Barnett and his co-workers (Science, 123, 141 (1956)) have shown that the production of β-carotene is improved by the simultaneous culture of the opposite forms of one species. This study was thereafter extended to the culture of opposite forms of different species (C. Hesseltine, Mycologia, 49, 449 (1957)). The culture media were also examined and it was found that the addition of whole or hydrolysed seeds, of vegetable oils, of surface-active agents, of antioxidants and of thickening agents increased the β-carotene yield. (R. Anderson and others, J. Agr. Food Chem. 6, 543 (1958).) (A. Ciegler and others, App. Microb. 7, 94 and 98 (1959).)

Finally, Mackinney and his co-workers (J. Am. Chem. Soc. 74, 3456 (1952)) have shown that the addition of β-ionone to the static culture of a Phycomyces greatly increases the formation of β-carotene to the detriment of other carotenoid pigments. Anderson and others noted the same effect in agitated culture with Blakeslea and Choanephora (loc. cit.).

It has now been found, and this forms the subject of the present invention, that it is advantageous to replace β-ionone in culture media by 2,2,6-trimethylcyclohexanone or its functional derivatives. Such compounds are less complex and therefore more readily obtainable than β-ionone, and their use results in a considerable increase in the rate of production of β-carotene as compared with reference media containing no precursor.

By "functional derivatives" are meant the products of condensation of 2,2,6-trimethylcyclohexanone with ammonia or its monosubstituted derivatives, such as the oxime, the hydrazone, the semicarbazone, the thiosemicarbazone or the imines, all of which, in common with 2,2,6-trimethylcyclohexanone itself, are 2,2,6-trimethylcyclohexane derivatives double-bonded at the 1-carbon atom to a functional atom or group. Of these derivatives of 2,2,6-trimethylcyclohexanone, the semicarbazone is preferred.

2,2,6-trimethylcyclohexanone (or its derivative) may be added to the culture medium in quantities ranging from 0.1 to 10 g./litre, at the commencement or during the course of the fermentation, in one or more lots. Preferably, a quantity between 0.8 and 3 g./litre is employed and the addition is carried out after 1 to 3 days of culture. Regardless of the quantity of 2,2,6-trimethylcyclohexanone or its derivative which is added, and regardless of the time of the addition, it is desirable to continue the culture for 6 to 10 days after the inoculation in order to obtain maximum production of β-carotene. The culture medium may vary, but contains essentially a source of assimilable carbon and a source of assimilable nitrogen, mineral elements and, where necessary, growth factors, antioxidants, surface-active agents and thickeners.

A source of assimilable carbon there may be used carbohydrates (such as glucose, dextrins and starch), animal or vegetable oils (such as lard oil, soya bean oil, and cotton seed oil) or mixtures thereof. The suitable sources of assimilable nitrogen are extremely varied, and they may be defined chemical compounds or complex substances containing nitrogen mainly in protein form, such as casein, lactalbumin, gluten and their hydrolysates, soya bean fluor, peanut fluor, yeast extracts, distillers' solubles and corn-steep.

Some of the mineral elements added may have a buffer or neutralising effect, such as alkali or alkaline-earth phosphates.

The most frequently employed of the growth factors is vitamin $B_1$ or thiamine. Of the antioxidants, there may be mentioned N,N'-diphenylparaphenylenediamine, 2,2,4-trimethyl-6-ethoxy-1,2-dihydroquinoline, ascorbic acid or sorbic acid. The surface-active agents are preferably of the non-ionic type, such as derivatives of sorbitol with fatty acids, or products based on ethylene oxide condensation products. The most commonly employed thickeners are starch, carboxymethylcellulose and agar.

It has been found that in these media 2,2,6-trimethylcyclohexanone and its derivatives are compatible with the auxiliary substances described in the French patent application No. 899,751, filed on June 5, 1962, under the title "Process for the Production of β-Carotene," that is to say: with amides of the general formula:

$$RCONR_1R_2$$

(in which R represents a hydrogen atom, an alkyl radical having at most 6 carbon atoms or an aryl or aralkyl radical, and $R_1$ and $R_2$, which are identical or different, each represent a hydrogen atom or an alkyl radical having at most 4 carbon atoms, or dialkylsulphoxides whose alkyl radicals contain at most 4 carbon atoms. The culture medium thus prepared is thereafter inoculated with a culture of the + and − forms of Blakeslea trispora (NRRL 2456 and 2457).

The following examples illustrate the invention:

*Example 1*

A number of 300 cc. Erlenmeyer flasks are filled with 50 cc. of a culture medium having the following composition:

| | | |
|---|---|---|
| Corn seed hydrolysate | g | 75 |
| Soya bean oil | cc | 20 |
| Cotton seed oil | cc | 20 |
| "Tween 80" | cc | 1.2 |
| Potassium monophosphate | g | 0.5 |
| Carboxymethylcellulose | g | 20 |
| Thiamine hydrochloride | g | 0.01 |
| Distilled water to make 1000 cc. | | |

The pH of the medium is adjusted to 6.2 with concentrated sodium hydroxide. The flasks are sterilised for 20 minutes at 120° C. After cooling, there is added under sterile conditions to each flask 0.5 cc. of a sterile 1% 1,2-dihydro-2,2,4-trimethyl-6-ethoxyquinoline solution in petroleum.

Each flask is thereafter inoculated with 5 cc. of an agitated culture containing the two forms, + and −, of the Blakeslea trispora strain (NRRL 2456 and NRRL 2457), and aged 24 hours.

The flasks are thereafter placed on a rotary agitating table turning at 220 r.p.m. in a chamber at 27° C. After incubation for 2 days, the contents of the flasks are divided into two equal lots.

To each flask of the first lot is added under sterile conditions 0.5 cc. of petroleum.

Each flask of the second lot receives 0.5 cc. of a 10% 2,2,6-trimethylcyclohexanone solution in petroleum.

The cultures are continued under the same conditions of temperature and agitation for 6 further days. At the end of this time, the production of β-carotene is maximum in all the flasks.

The yield of β-carotene is determined as follows: the mycelium is separated by filtration, washed with water and then dried overnight in vacuo at 35° C. The dry mycelium is thereafter extracted by means of hexane. The β-carotene is separated from the other carotenoids present by chromatography of the extract through alumina. The elution fractions containing β-carotene are combined and spectrophotometrically titrated as compared with a pure specimen of β-carotene.

The productions are as follows:

| 2,2,6-trimethylcyclohexanone, g./l. of initial medium: | β-Carotene, mg./l. of broth |
|---|---|
| 0 | 105 |
| 1 | 170 |

*Example II*

500 cc. of water containing 75 g. of distillers' solubles are boiled for 15 minutes. After cooling, there are added:

| | | |
|---|---|---|
| Corn starch | g | 50 |
| Soya bean oil | cc | 30 |
| Cotton seed oil | cc | 30 |
| "Tween 80" | cc | 1.2 |
| Yeast extract | g | 1 |
| Potassium monophosphate | g | 0.5 |
| N,N'-diphenylparaphenylenediamine | g | 0.1 |
| Thiamine hydrochloride | g | 0.01 |

The volume is made up to 1000 cc. with distilled water.

The mixture is adjusted to a pH of 6.0 with sodium hydroxide, distributed in 300 cc. Erlenmeyer flasks (50 cc. per flask) and then sterilised for 20 minutes at 120° C. After cooling, 0.5 cc. of petroleum is added to each flask under sterile conditions.

The inoculation with a mixed culture of the + and − forms of *Blakeslea trispora* and the development of the inoculated cultures take place under the conditions described in Example I.

After development for 48 hours, the culture flasks are distributed in 4 series and each flask receives the following additions under sterile conditions:

1st series: petroleum 0.5 cc.
2nd series: 50 mg. of 2,2,6-trimethylcyclohexanone in solution in 0.5 cc. of petroleum.
3rd series: 100 mg. of 2,2,6-trimethylcyclohexanone in solution in 0.5 cc. of petroleum.
4th series: 150 mg. of 2,2,6-trimethylcyclohexanone in solution in 0.5 cc. of petroleum.

The cultures are continued for a further 8 days.

The β-carotene yields, determined as in Example I, are as follows:

| 2,2,6-trimethylcyclohexanone, g./litre of medium: | β-Carotene, mg./l. of broth |
|---|---|
| 0 | 470 |
| 1 | 690 |
| 2 | 695 |
| 3 | 740 |

*Example III*

500 cc. of water containing 75 g. of distillers' solubles are boiled for 15 minutes. After cooling, there are added:

| | | |
|---|---|---|
| Corn starch | g | 50 |
| Soya bean oil | cc | 30 |
| Cotton seed oil | cc | 30 |
| "Tween 80" | cc | 5 |
| Yeast extract | g | 1 |
| Potassium monophosphate | g | 0.5 |
| Dimethylformamide | cc | 2 |
| Manganese sulphate monohydrate | g | 0.1 |
| Thiamine hydrochloride | g | 0.01 |

The volume is made up to 1000 cc. with distilled water. The mixture is adjusted to a pH of 6.0 with sodium hydroxide and distributed in 300 cc. Erlenmeyer flasks (50 cc. per flask). After sterilisation for 20 minutes at 120° C. and cooling, there is added to each flask under sterile conditions 0.5 cc. of a 1% 2,2,4-trimethyl-6-ethoxy-1,2-dihydroquinoline solution in petroleum.

Inoculation with a mixed culture of the + and − forms of *Blakeslea trispora* and development of the inoculated cultures takes place under the conditions indicated in Example I.

After development for 48 hours, the culture flasks are distributed in 3 series and each Erlenmeyer flask receives the following additions under sterile conditions:

1st series: 0.5 cc. of petroleum.
2nd series: 50 mg. of 2,2,6-trimethylcyclohexanone in solution in 0.5 cc. of petroleum.
3rd series: 60 mg. of semicarbazone of 2,2,6-trimethylcyclohexanone in the form of a 7% suspension in water containing 1% of "Tween 80" and 0.5 cc. of petroleum.

After these additions, the cultures are continued for 6 more days under the same conditions of temperature and agitation. After this time, the β-carotene production is maximum in all the flasks.

The yields of β-carotene, determined as in Example I, are as follows:

| Addition at 48 hours: | Yield of β-carotene in mg./l. of broth |
|---|---|
| Petroleum | 820 |
| 2,2,6-trimethylcyclohexanone+petroleum | 940 |
| Semicarbazone of 2,2,6-trimethylcyclohexanone+petroleum | 1110 |

*Example IV*

Into a 30 litre fermentation vessel are introduced:

| | | |
|---|---|---|
| Distillers' solubles | g | 1500 |
| Water | litres | 11 |

The mixture is stirred and heated at 95° C. for 10 minutes. After cooling, the pH is adjusted to 6.4 with 70 cc. of 10 N sodium hydroxide and the medium is made up with the following starting materials:

| | | |
|---|---|---|
| Starch | g | 750 |
| Soya bean oil | cc | 450 |
| Cotton seed oil | cc | 450 |
| "Tween 80" | cc | 75 |
| Yeast extract | g | 15 |
| Potassium monophosphate | g | 7.5 |
| Manganese sulphate monohydrate | g | 1.5 |
| 2,2,4-trimethyl-6-ethoxy-1,2-dihydroquinoline | cc | 1.5 |
| Thiamine hydrochloride solution (0.3 g./litre) | cc | 250 |

The volume is adjusted to 15 litres with water, the pH of the mixture being at 6.40. The medium is sterilized for 50 minutes at 122° C. with injection of steam. After cooling, the pH is 5.85 and the volume is 14.2 litres.

There are then added under sterile conditions 30 cc. of dimethylformamide and 150 cc. of petroleum. The fermentation vessel is thereafter inoculated with two inoculum cultures in fermentation vessels, aged 48 hours, of the strain *Blakeslea trispora* in a portion of 750 cc. of culture of the + form (NRRL 2456) and 750 cc. of culture of the − form (NRRL 2457). The culture is developed at 26–27° C. while stirring by means of a turbine at 400 r.p.m. and aerating with a rate of flow of 1.2 m.³/h.

After development for 48 hours, 15 cc. of 2,2,6-trimethylcyclohexanone in solution in 150 cc. of petroleum are added under sterile conditions. After this addition, the culture is continued under the same conditions of aeration, agitation and temperature for 5 further days.

The production of β-carotene, titrated as indicated in Example I, then reaches 580 mg./l.

In another 30 litre fermentation vessel, the above-described medium is prepared in the same way. After sterilisation and cooling, there are also added 30 cc. of dimethylformamide and 150 cc. of petroleum. The medium is thereafter inoculated under the conditions described in the foregoing with the same inoculum cultures. After development for 48 hours, 150 cc. of petroleum and 21 g. of 2,2,6-trimethylcyclohexanone semicarbazone in the form of a 7% suspension in water containing 1% of "Tween 80" are added under sterile conditions. After these additions, the culture is continued under the same conditions of aeration, agitation and temperature for 5 further days.

The $\beta$-carotene production is then 765 mg./l.

We claim:

1. Process for the production of $\beta$-carotene which comprises the steps of (a) inoculating with a mixture of the + and − forms of *Blakeslea trispora* a medium containing a source of assimilable nitrogen, a source of assimilable carbon, mineral elements, and 2,2,6-trimethylcyclohexanone or 2,2,6-trimethylcyclohexanone semicarbazone, to form a culture, (b) fermenting the culture under aerobic conditions, and (c) recovering $\beta$-carotene from the culture.

2. Process according to claim 1 wherein the 2,2,6-trimethylcyclohexanone or 2,2,6-trimethylcyclohexanone semicarbazone is present in the medium in an amount of up to 3 g. per litre of medium.

3. Process for the production of $\beta$-carotene which comprises the steps of (a) inoculating with a mixture of the + and − forms of *Blakeslea trispora* a medium containing a source of assimilable nitrogen, a source of assimilable carbon, and mineral elements to form a culture, (b) fermenting the culture under aerobic conditions, (c) adding to the culture 2,2,6-trimethylcyclohexanone or 2,2,6-trimethylcyclohexanone semicarbazone, (d) continuing to ferment the culture under aerobic conditions, and (e) recovering $\beta$-carotene from the culture.

4. Process according to claim 3 wherein the 2,2,6-trimethyl cyclohexanone or 2,2,6-trimethylcyclohexanone semicarbazone is added to the culture after fermentation has proceeded for 1 to 3 days, and fermentation is thereafter continued until 6 to 10 days after the inoculation.

5. Process for the production of $\beta$-carotene which comprises the steps of (a) inoculating wtih a mixture of the + and − forms of *Blakeslea trispora* a medium containing a source of assimilable nitrogen, a source of assimilable carbon, and mineral elements to form a culture, (b) fermenting the culture under aerobic conditions for 1 to 3 days, (c) adding to the culture 2,2,6-trimethylcyclohexanone or 2,2,6-trimethylcyclohexanone semicarbazone in an amount of up to 3 g. per litre of culture, (d) continuing to ferment the culture under aerobic conditions until 6 to 10 days after the inoculation, and (e) recovering $\beta$-carotene from the culture.

References Cited by the Examiner

UNITED STATES PATENTS

| 2,959,522 | 11/1960 | Zajic | 195—28 |
| 3,079,380 | 2/1963 | Ciegler et al. | 195—28 |

OTHER REFERENCES

Organic Chemistry, by Karrer, 2nd ed., Elsevier Publishing Co., Inc., New York, 1946, pp. 666 to 672.

A. LOUIS MONACELL, *Primary Examiner.*